Nov. 1, 1932.  W. C. DURYEA  1,885,323
PRIME MOVER
Filed May 29, 1931  5 Sheets-Sheet 1
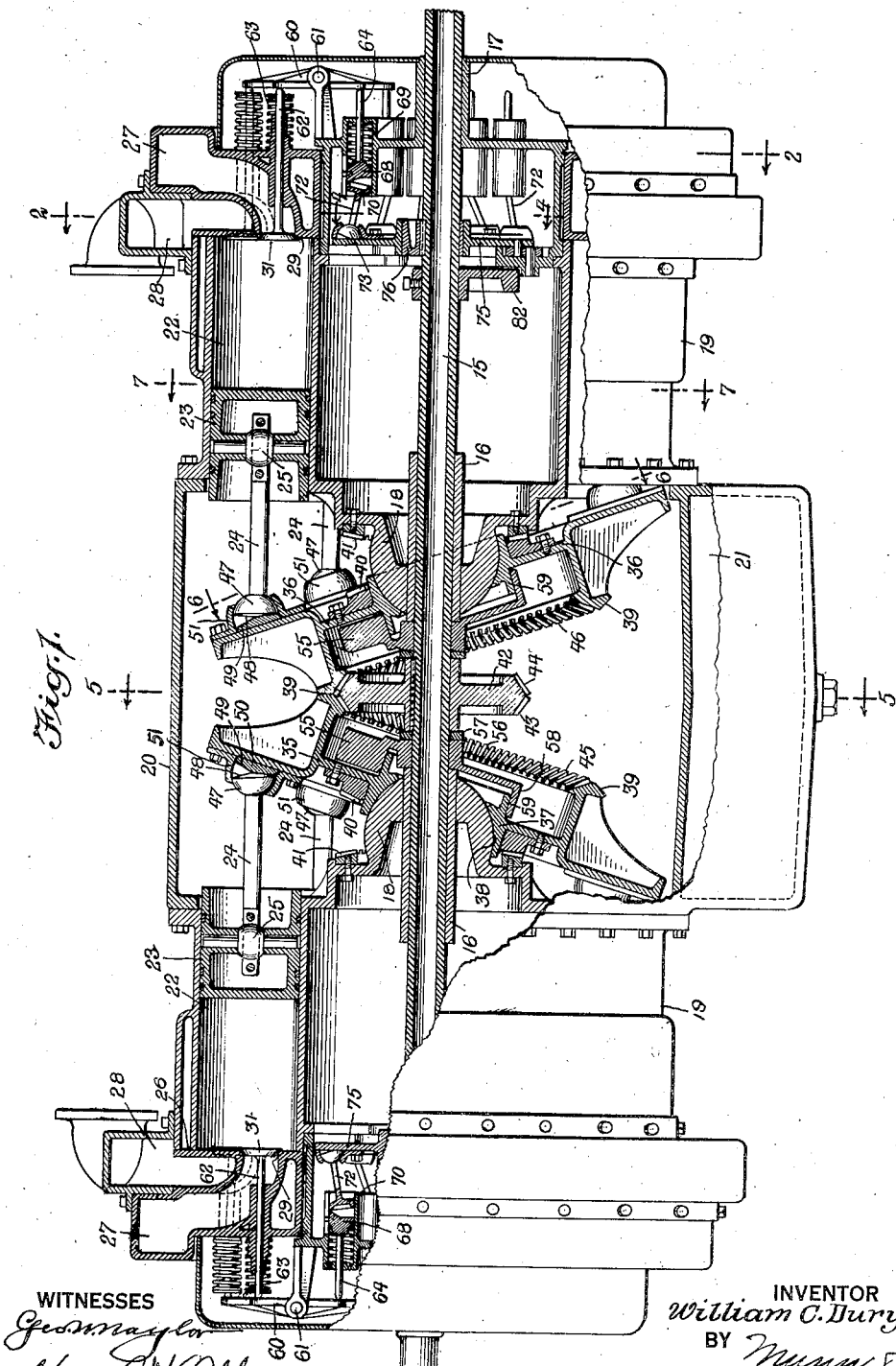
WITNESSES
INVENTOR
William C. Duryea
BY Munn & Co.
ATTORNEYS Nov. 1, 1932.  W. C. DURYEA  1,885,323
PRIME MOVER
Filed May 29, 1931   5 Sheets-Sheet 2
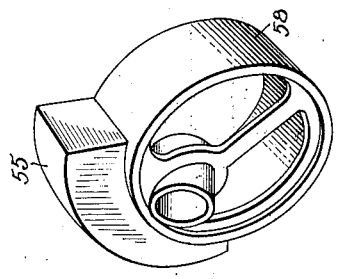
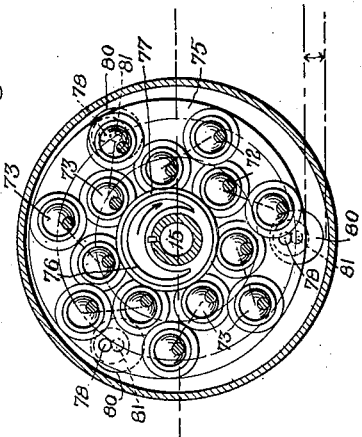
INVENTOR
William C. Duryea
BY Munn & Co.
ATTORNEYS Nov. 1, 1932.    W. C. DURYEA    1,885,323
PRIME MOVER
Filed May 29, 1931    5 Sheets-Sheet 3
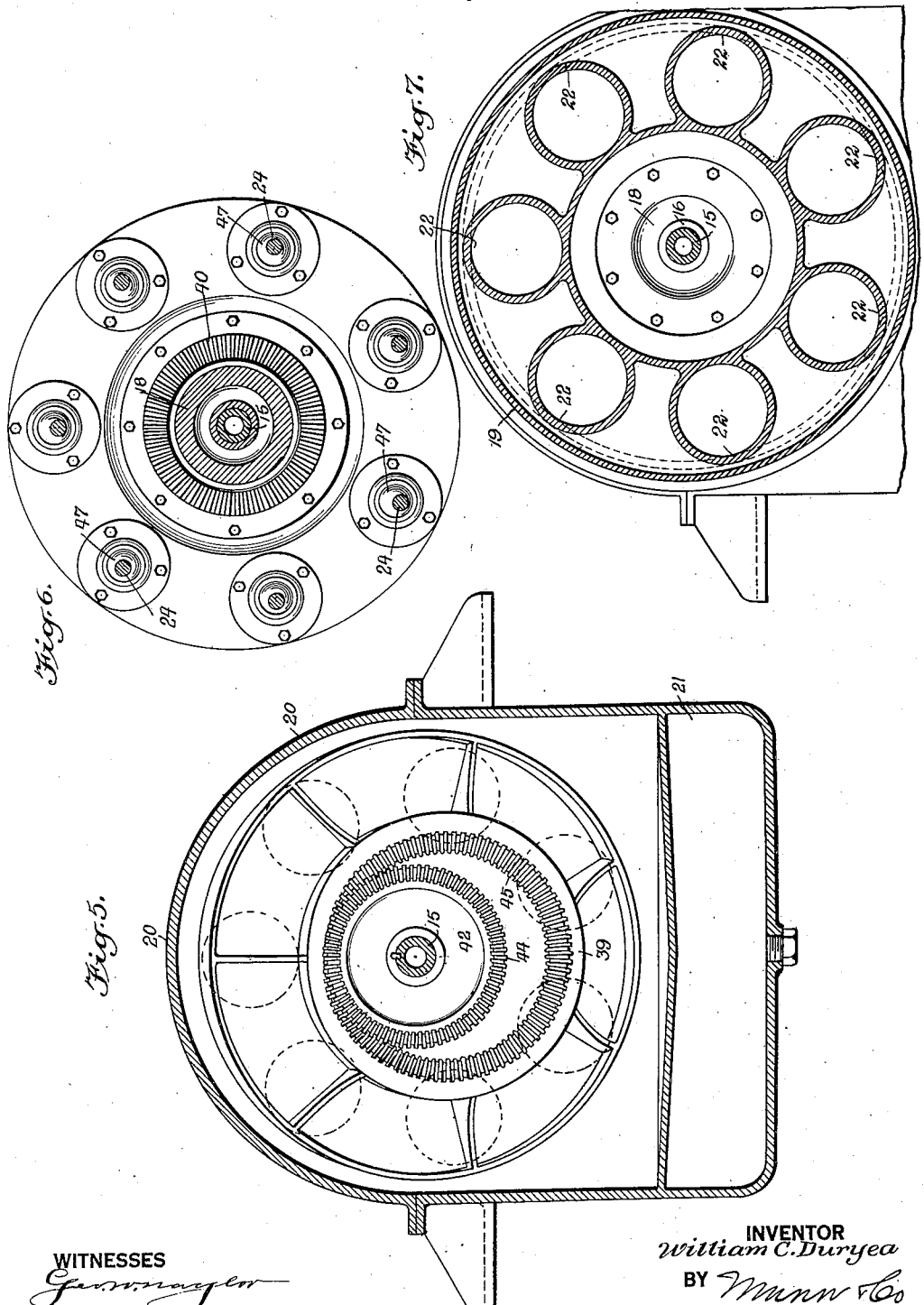
WITNESSES
INVENTOR
William C. Duryea
BY
ATTORNEYS Nov. 1, 1932.  W. C. DURYEA  1,885,323
PRIME MOVER
Filed May 29, 1931   5 Sheets-Sheet 4
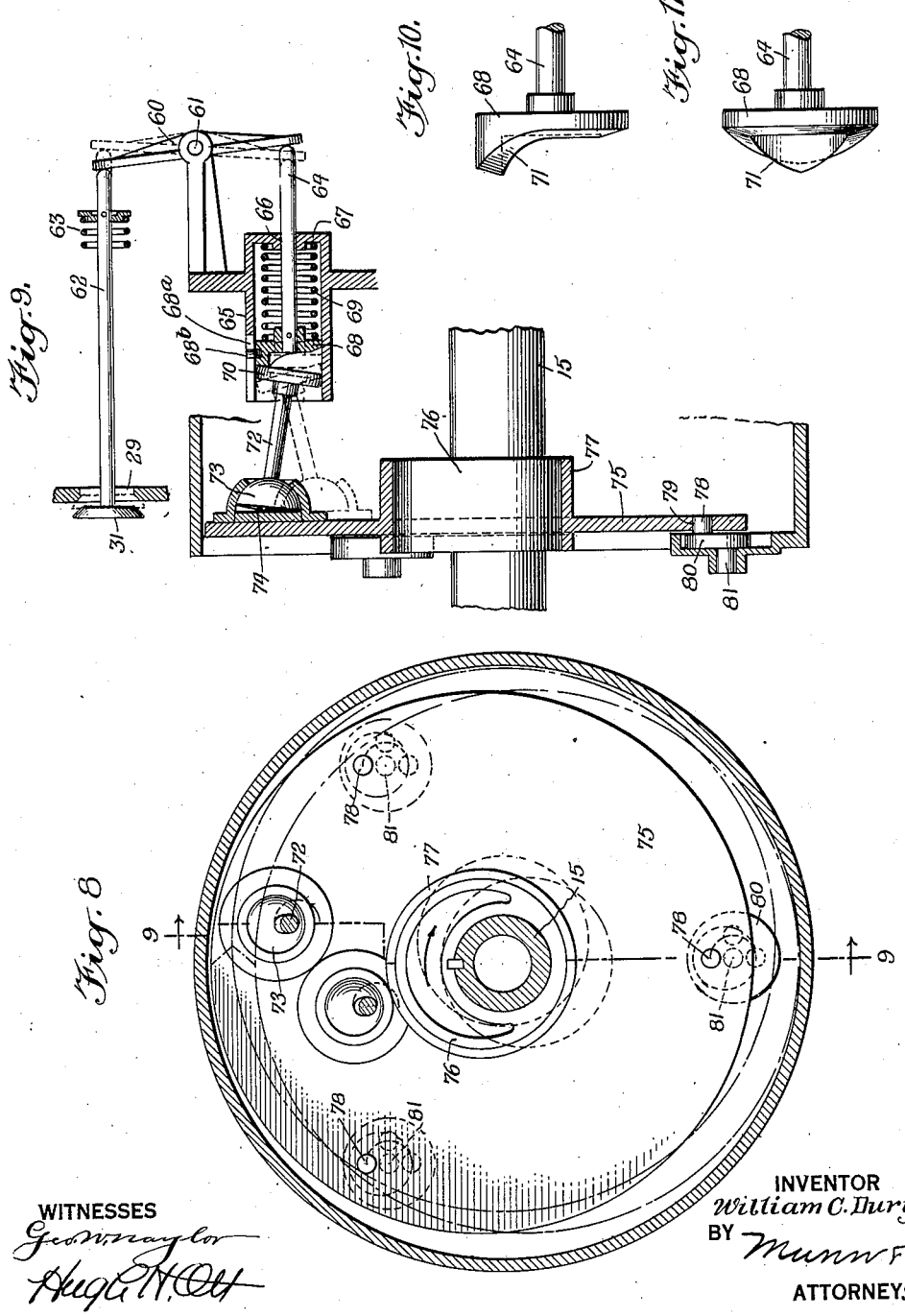
WITNESSES
INVENTOR
William C. Duryea
BY Munn & Co.
ATTORNEYS

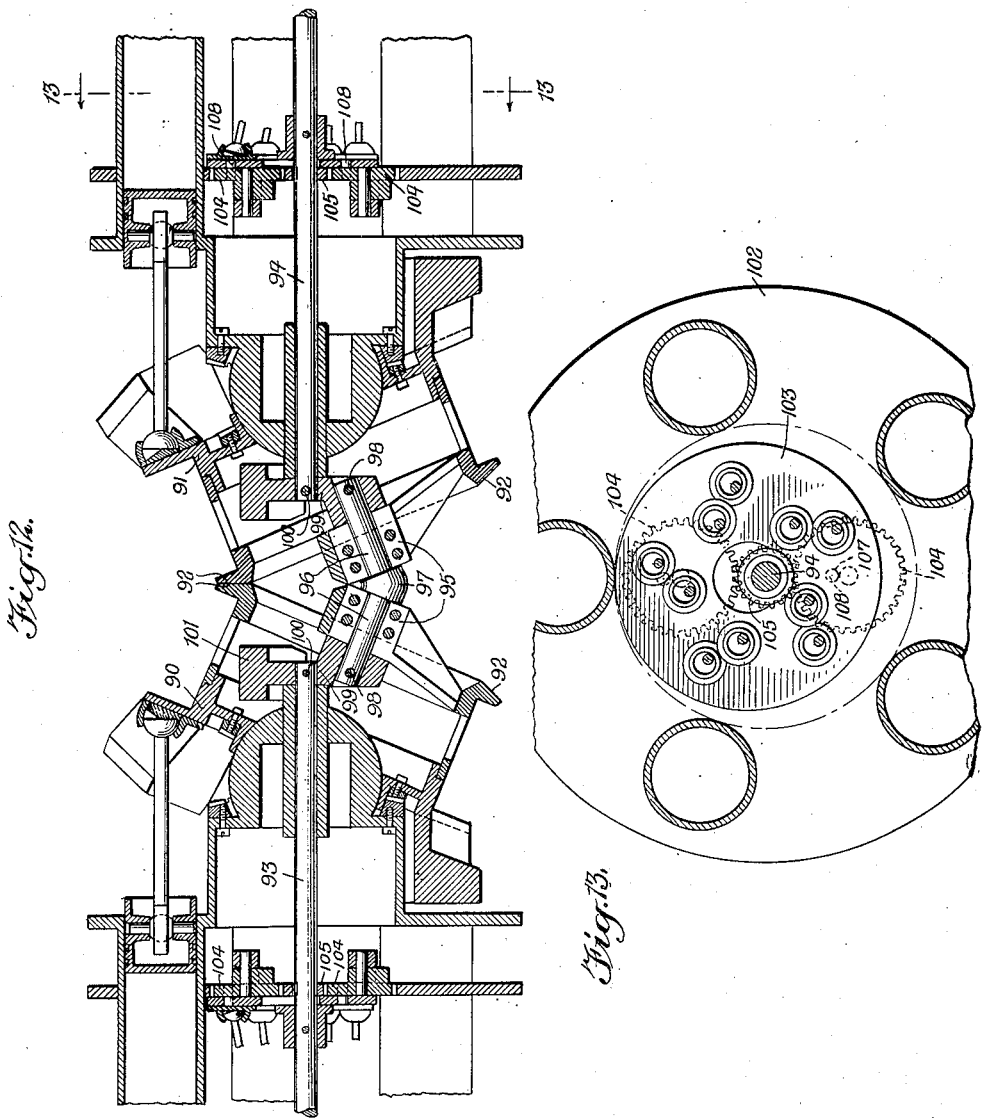

Patented Nov. 1, 1932

1,885,323

UNITED STATES PATENT OFFICE

WILLIAM C. DURYEA, OF PRINCETON, NEW JERSEY

PRIME MOVER

Application filed May 29, 1931. Serial No. 541,070.

This invention relates to prime movers, and has particular reference to an improved motor of the reciprocatory piston type, which is operable by internal combustion and which employs the wabbler principle for transmission of the power strokes or impulses of the pistons to exert a torque on the motor drive shaft.

The present invention broadly aims to generally improve motors of the internal combustion types, which have hitherto been devised by materially reducing, if not wholly eliminating, many objectionable features which obtain in the usual crank shaft motors, such as tortional vibration, the lack of proper static and dynamic balance, the latter resulting in a high pitched vibration in moderate and high speed operation, the tendency of the piston to cant in the cylinder causing wear which results in loss of compression and power, oil pumping, dilution of the lubricant anl rapid formation of carbon.

The invention further aims to improve those motors which have heretofore operated on the wabbler principle by employing a pair of opposed wabbler elements which particularly function to cancel out oppositely acting reciprocatory piston forces during their power strokes, by virtue of which there is attained a highly efficient dynamic balance.

The invention further resides in the provision of a rolling contact between the wabbler elements, by virtue of which the wear on the surfaces is so negligible as to be practically incalculable and hence unworthy of consideration.

As a further feature, the invention embodies a connection between the piston or connecting rods and the wabbler elements which affords a rolling contact to compensate for the slight relative swinging or rocking movement imparted to the piston and connecting rods, whereby wear at this point is reduced to a minimum.

The invention further embodies a valve lifting mechanism which is operable by an eccentric and in which the reciprocatory motion of the lift rods is effected through the medium of a rolling and rocking contact of a wabbler element with a specially designed cam face.

Other objects of the invention reside in the comparative simplicity of construction and mode of operation of the motor, the economy with which it may be produced and maintained in working operation and the general efficiency derived therefrom.

With the above recited and other objects in view, reference is had to the following description and accompanying drawings, in which there are exhibited several preferred embodiments of the invention, while the claims define the actual scope of the same.

In the drawings:

Figure 1 is a side view of a motor constructed in accordance with the invention, parts being broken away and shown in section to disclose the underlying structure.

Figure 2 is an enlarged transverse sectional view taken approximately on the line indicated at 2—2 in Figure 1.

Figure 3 is a perspective view of one of the static counterbalance weights for the wabbler elements.

Figure 4 is an enlarged transverse sectional view taken approximately on the line 4—4 of Figure 1, and particularly illustrating the valve lift rod actuating mechanism.

Figure 5 is a central transverse sectional view taken approximately on the line indicated at 5—5 in Figure 1.

Figure 6 is a fragmentary transverse sectional view taken approximately on the line indicated at 6—6 in Figure 1.

Figure 7 is a fragmentary transverse sectional view taken approximately on the line indicated at 7—7 in Figure 1.

Figure 8 is an enlarged sectional view similar to Figure 4 and illustrating only one set of intake and exhaust valve actuating elements.

Figure 9 is a sectional view taken approximately on the line 9—9 of Figure 8.

Figures 10 and 11 are side elevations of one of the lift rod cams.

Figure 12 is a fragmentary longitudinal sectional view of a modified form of the invention.

Figure 13 is a transverse sectional view thereof taken approximately on the line 13—13 of Figure 12.

Referring to the drawings by characters of reference, and particularly to the preferred form illustrated in Figures 1 to 11, exclusive, 15 designates the motor drive shaft, which in the present instance is disclosed as of tubular or hollow formation and which is journaled for rotation in axially spaced inner and outer bearing sleeves or bosses 16 and 17. The inner bearing sleeves or bosses 16 are formed integral with or affixed to substantially spheroidal bearings 18 which coincide with the axis of rotation of the drive shaft and which form a fixed or integral part of each of a pair of cylinder blocks 19 which are spaced apart and connected together by a housing 20, which housing may include an oil sump 21. Each cylinder block 19 is provided with a circular series of cylinder bores 22 of an unequal number, seven cylinders being illustrated in the preferred form of the invention. The cylinders 22 open at their inner ends into the housing or casing 20, and each cylinder has mounted therein for reciprocation a piston 23 provided with a piston or connecting rod 24 which is connected with the piston for movement by a universal joint 25. The outer ends of the cylinders of each cylinder block are closed respectively by a common head 26, which head is constructed and subdivided in such a manner as to produce the intake and exhaust manifolds 27 and 28 defining intake and exhaust ports 29 and 30 which are designed to be respectively controlled by the intake and exhaust valves 31 and 32 to open and close said ports in the usual manner for admitting a combustible fuel and for exhausting the same from the cylinders.

The impulse or power strokes of the pistons are transmitted and converted to a rotary motion to exert a torque on the drive shaft 15 through a power transmitting mechanism. This mechanism as illustrated in Figures 1 to 11, inclusive, consists of a pair of opposed wabbler elements 35 and 36, each of which has an annular hub 37 formed with a spheroidal bearing surface 38 which bears upon the spheroidal bearings 18 to admit of a wabbling action of the wabbler elements 35 and 36. The wabbler elements are further provided with annular conical faces 39 which are adapted for rolling contact with each other, whereby the wabbler elements are constantly disposed at a predetermined oblique relation to the drive shaft axis. The wabbler elements 35 and 36 are further provided on their outer sides with ring gears 40 which have a rolling meshing engagement with a ring gear 41 disposed concentrically of their bearings 18, and which ring gears serve to prevent relative rotation of the wabbler elements with respect to each other or with respect to the motor blocks or other stationary parts of the motor. The wabbling or rocking and rolling motion of the wabbler elements is converted into a continuous rotary motion to turn the drive shaft 15 by means of a double rotary bevel pinion 42 which has two sets of teeth 43 and 44, the former meshing with a bevel gear 45 on the wabbler element 35 and the latter meshing with a bevel gear 46 on the wabbler element 36. The piston or connecting rods 24 at their free inner ends are formed with a substantially semi-spherical head 47 having a flat conical face 48, which face 48 is designed for rolling contact with a similar conical face 49 on a thrust block 50, which blocks 50 are secured in circumferentially spaced relation to the outer sides of the wabbler elements 35 and 36 respectively. Each thrust block is arranged within the confines of a bearing socket 51 which has an inner semi-spherical surface corresponding approximately to the semi-spherical head 47. This establishes a connection between each piston or connecting rod 24 and the respective wabbler elements so that the thrusts of the impulse or power strokes are obtained through the medium of a rolling and rocking contact of the faces 48 and 49. In operation, the aligned pistons and each motor block progressively impart at similar circumferentially spaced points in advance of the point of engagement of the contact faces 39, power thrusts to impart wabbling motion to the opposed wabbler elements. This wabbling or rolling and rocking motion through the medium of the ring gears 45 and 46 and double beveled pinion 42 turns the drive shaft in one direction. It will be observed that the driving forces of the opposed piston sets are cancelled out on the wabbler elements, thereby making for a more perfect dynamic balance of the motor. Due to the fact that the piston or connecting rods have but a very slight rocking motion with reference to the pistons, it is apparent that wear on the pistons and cylinders and packing rings is reduced to a minimum and the direct thrust obtained in the application of power makes for high efficiency in operation.

In order to obtain proper static balance of the wabbler elements, each of said elements is counterbalanced by a weight 55 which is formed with a hub 56 for independent rotation on the drive shaft 15 between the inner ends of the inner bearings 16 and a washer 57 which is interposed between the hub 56 and the double bevel pinion 42. The weight is rotated in an opposite direction to the direction of rotation of the drive shaft 15 by an eccentric ring 58, the inner eccentric surface of which is disposed at an angle or pitch with reference to the drive shaft and coincides with an eccentric ring actuating rim 59 carried by and disposed axially of each wabbler element.

The valve actuating mechanism includes rockers 60, all of which are substantially identical and each of which rockers is fulcrumed as at 61, so that one extremity engages the valve stem 62 to either depress the same against the action of the valve closing spring 63 for opening the valve or permit of the closing of the valve under the spring action. The opposite end of each rocker is engaged by a lift rod 64, and each lift rod is guided for reciprocal motion by a fixed cylindrical guide 65 through an aperture 66 in the closed end 67 and by the head 68 which snugly fits within the guide. In order to prevent turning motion of the lift rod 64 and its head 68 with respect to the cylindrical guide 65, a longitudinal slot 68a is formed in the guide 65 and a pin 68b extends radially from the head into the guide slot 68a. The lift rod 64 is normally retracted by a spring 69 which surrounds the rod and is enclosed within the guide 65 and interposed between the head 68 and the closed end 67. Lift motion is imparted to the lift rod 64 against the action of the spring 69 by a wabbler disk 70 which engages the cam face 71 on the lift rod head 68, the cam face 71 being developed in such a manner that the wabbler disk upon each complete motion effects a rolling and rocking engagement with the cam face to cause the lift rod to be actuated once. The wabbler disk 70 is rigidly secured to one extremity of a stem 72 which protrudes through the open end of the guide 65 and which is provided with a semi-spherical head 73 having a conical face 74. Motion is imparted to all of the wabbler disks of each motor block by the eccentric plates 75, to which a cycloidal motion is imparted by virtue of the engagement of an eccentric 76 on the drive shaft 15 with a hub 77 on the eccentric plate 75. The eccentric plate is limited to said cycloidal motion by means of a plurality of circumferentially spaced crank pins 78 which engage in apertures 79 in the eccentric plate, and which eccentric pins are carried by rotary elements 80 which are journaled as at 81. In order to counterbalance the eccentric plates 75, counterbalance weights 82 are secured to the drive shaft 15 adjacent each eccentric plate.

The motor may be suitably cooled, lubricated and housed, but inasmuch as this forms no part of the present invention, no specific reference is made thereto. The firing order of the cylinders of each block is the same, and, preferably, the odd and even cylinders alternately fire progressively, namely, one, three, five, seven, two, four, six, one, etc. The power impulses are thus progressively imparted to the wabbler elements 35 and 36 around the circumference thereof at a point in advance of the point of contact of the frusto-conical faces 39 and the intake strokes of the pistons are caused by the drawing of the pistons inwardly through the engagement of the semi-spherical heads 47 with the semi-spherical bearings 51, while the outward compression and exhaust strokes of the piston are caused by the rolling, rocking and thrust action of the thrust blocks 50 against the heads 47 of the connecting or piston rods 24.

The wabbler elements with the connecting rod and piston assembly when in motion effect a simple harmonic motion, due to the fact that there is only a slight lateral rocking of the piston or connecting rods. By opposing the two assemblies of wabbler elements and cylinder blocks and pistons to work in opposite directions, the motor is approximately in perfect dynamic balance and the reciprocating forces due to inertia are thereby cancelled out on the two rolling frusto-conical surfaces 39 of the wabbler element, these being always in contact at the point where the two opposing firing pistons are at the limit of their outstroke. Due to the fact that all thrust strokes, both in the motion converting and power transmission parts and in the valve actuating means, are taken up by a rolling motion, wear is negligent.

In the modified form of the invention illustrated in Figures 12 and 13, the wabbler elements 90 and 91, while provided with coacting frustro-conical surfaces 92, are provided with a different system of transmitting their wabbling motion to the drive shaft sections 93 and 94 of the motor. In this instance, each wabbler element is formed with an axially disposed bearing 95 which snugly receives the annularly related portions 96 of a crank 97, which portions are in turn keyed as at 98 to an arm 99, which arms are in turn keyed at 100 to each of the drive shafts 94 so that the drive shafts are turned in unison through the crank 97. The arms 100 also support the counterbalance weight 101. In this instance also, each cylinder block 102 is provided with a valve actuating eccentric plate 103 which is actuated to effect a cycloidal motion from its drive shaft. In this instance, however, the motion is imparted through a pair of diametrically opposite gears 104 which mesh with a pinion 105 on the motor shaft, and which gears 104 are provided with eccentric pins 106 journaled in apertures 107 in the eccentric plate. In all respects, the mode of operation and construction of the motor are identical with that described in the preferred form.

While there have been illustrated and described several preferred embodiments of the invention, no limitation is intended to the precise structural details, and variations and modifications which properly fall within the scope of the claims are reserved.

What is claimed is:

1. In a motor, a drive shaft journaled for rotation, a pair of opposed wabbler elements mounted obliquely relative to the drive shaft and having frusto-conical annular faces constantly engaging at one point, means for progressively imparting thrusts at circumferentially spaced points in advance of the point of contact of said annular faces, and a driving connection between said elements and the drive shaft for imparting rotation to the latter upon wabbling of the wabbler elements.

2. In a motor, a drive shaft journaled for rotation, a pair of opposed wabbler elements mounted obliquely relative to the drive shaft and having frusto-conical annular faces constantly engaging at one point, an annular set of cylinders arranged concentric to the axis of the drive shaft with reference to the wabbler elements and having their axes parallel to the drive shaft, a reciprocatory piston in each cylinder having a piston rod bearing at its free end against the wabbler element for progressively imparting thrusts at circumferentially spaced points in advance of the point of contact of said annular faces, and a driving connection between said elements and the drive shaft for imparting rotation to the latter upon wabbling of the wabbler elements.

3. In a motor, a drive shaft journaled for rotation, a pair of opposed wabbler elements mounted obliquely with reference to the drive shaft and provided respectively with contacting frusto-conical annular faces for rolling contact, a connection between the wabbler elements and the drive shaft for turning the latter upon wabbling of the former, and means for progressively imparting at circumferentially spaced points, inward thrusts against the corresponding outer surfaces of said elements to effect a continuous movement of the annular faces toward each other.

4. An internal combustion motor including a drive shaft journaled for rotation, a double beveled pinion fixed to the drive shaft, a pair of opposed wabbler elements journaled on the axes coinciding with the drive shaft and spaced equidistantly with reference to said pinion, a beveled ring gear on each wabbler element, said gears being in constant mesh at corresponding points with the double beveled pinion to impart turning motion thereto, to rotate the drive shaft upon wabbling of the wabbler elements, and means for progressively imparting thrusts upon corresponding points of the wabbler elements in advance of the points of meshing of the ring gears with the double beveled gear.

5. A prime mover having the combination of a drive shaft journaled for rotation, a pair of wabbler elements journaled on axes coinciding with the drive shaft axis and spaced axially with respect thereto, frusto-conical annular portions of the wabbler elements adapted for rolling contact with each other, means for preventing rotation of the wabbler elements, interengaging means on the wabbler elements and the drive shaft for turning the latter upon wabbling motion imparted to the former, and a set of cylinders and reciprocatory pistons operable by internal combustion for progressively imparting thrusts to the wabbler elements at circumferentially spaced points in advance of their point of contact.

6. A prime mover having the combination of a drive shaft journaled for rotation, a pair of wabbler elements journaled on axes coinciding with the drive shaft axis and spaced axially with respect thereto, frusto-conical annular portions of the wabbler elements adapted for rolling contact with each other, means for preventing rotation of the wabbler elements, interengaging means on the wabbler elements and the drive shaft for turning the latter upon wabbling motion imparted to the former, a set of cylinders and reciprocatory pistons operable by internal combustion for progressively imparting thrusts to the wabbler elements at circumferentially spaced points in advance of their point of contact, and piston rods connected respectively to the pistons and to the wabbler elements.

7. A prime mover having the combination of a drive shaft journaled for rotation, a pair of wabbler elements journaled on axes coinciding with the drive shaft axis and spaced axially with respect thereto, frusto-conical annular portions of the wabbler elements adapted for rolling contact with each other, means for preventing rotation of the wabbler elements, interengaging means on the wabbler elements and the drive shaft for turning the latter upon wabbling motion imparted to the former, a set of cylinders and reciprocatory pistons operable by internal combustion for progressively imparting thrusts to the wabbler elements at circumferentially spaced points in advance of their point of contact, and piston rods connected respectively to the pistons and to the wabbler elements, the connections between the connecting rods and the wabbler elements consisting of contacting conical portions having rolling and rocking engagement.

8. In a prime mover including a drive shaft journaled for rotation, a pair of opposed wabbler elements mounted obliquely to the drive shaft and having frusto-conical faces constantly engaging at one point and a driving connection between said elements and the drive shaft for imparting rotation to the latter upon wabbling of the former, means for statically balancing said wabbling elements including an annular collar protruding axially therefrom, a counterbalance weight for each element journaled on the drive shaft axis and having an obliquely disposed eccentric ring fitted over the collar.

9. In a prime mover including a drive shaft journaled for rotation, a pair of opposed wabbler elements mounted obliquely to the drive shaft and having frusto-conical faces constantly engaging at one point and a driving connection between said elements and the drive shaft for imparting rotation to the latter upon wabbling of the former, means for statically balancing said wabbler elements including an annular collar protruding axially therefrom, a counterbalance weight for each element journaled on the drive shaft axis and having an obliquely disposed eccentric ring fitted over the collar and operable to effect the turning of the weight in an opposite direction to the rotation of the driving shaft.

10. A motor having the combination of a common drive shaft, a pair of opposed wabbler elements mounted on relatively fixed bearings for wabbling motion and having frusto-conical contact faces for rolling engagement, an annular set of cylinders and reciprocatory pistons for each wabbler element spaced axially of the drive shaft with reference to their respective elements, the axes of the pistons and cylinders being parallel to and concentric with the axes of the drive shaft, and piston rods connected with the piston and having bearings at their free ends against the wabbler elements for progressively imparting at similar circumferentially spaced points in advance of the point of engagement of the contact faces, thrusts for imparting wabbling motion thereto and a driving connection between the wabbler elements and the drive shaft for turning said shaft by the wabbling motion imparted to said elements.

11. A motor having the combination of a common drive shaft, a pair of opposed wabbler elements mounted on relatively fixed bearings for wabbling motion and having frusto-conical contact faces for rolling engagement, an annular set of cylinders and reciprocatory pistons for each wabbler element spaced axially of the drive shaft with reference to their respective elements, the axes of the pistons and cylinders being parallel to and concentric with the axes of the drive shaft, and piston rods connected with the piston and having bearings at their free ends against the wabbler elements for progressively imparting at similar circumferentially spaced points in advance of the point of engagement of the contact faces, thrusts for imparting wabbling motion thereto, a driving connection between the wabbler elements and the drive shaft for turning said shaft by the wabbling motion imparted to said elements, and means for statically balancing each wabbler including an eccentric ring journaled on an axis coinciding with the drive shaft and having an obliquely disposed eccentric inner periphery, a circular actuator fitted within the eccentric ring and extending axially of and fixed to the wabbler element, and a weight protruding radially outward from the eccentric ring.

12. An internal combustion motor including two axially spaced sets of cylinders, each set being arranged in a circle, a shaft extending axially of said circles, reciprocatory pistons in each cylinder and a pair of opposed engaging rockable and rollable power transmission and motion converting elements operatively connected with the shaft and said pistons.

13. An internal combustion motor including two axially spaced sets of cylinders, each set arranged in a circle, a shaft extending axially of said circles, a pair of opposed engaging rockable and rollable power transmission and motor converting elements operatively connected with the shaft, a spherical bearing for each element upon which the same roll with their axes disposed at an angle to the axis of the shaft, reciprocatory pistons in the cylinders and piston rods connecting the pistons to the power transmitting and motion converting elements at similar circumferentially spaced points of said elements for progressively imparting thrusts thereagainst in advance of the point of engagement of the elements with each other.

14. An internal combustion motor having the combination of a drive shaft mounted for rotation, a wabbler driven by power impulses, means operated by the wabbler to impart rotational movement of the shaft, and a counterbalance weight for the wabbler mounted for wabbling and rotational movement.

15. In a motor, a drive shaft journaled for rotation, a pinion keyed to the drive shaft and having oppositely beveled peripheral teeth, a pair of opposed elements mounted for gyratory movement on axes spaced equi-distantly with reference to the pinion and on a line coinciding with the drive shaft axis and beveled ring gears meshing with the pinion at corresponding points whereby gyratory motion imparted to said elements effects rotation of the drive shaft.

16. In a motor, a drive shaft journaled for rotation, a pair of opposed wabbler elements mounted obliquely relative to the drive shaft and having frusto-conical annular faces constantly engaging at one point, means for progressively imparting thrusts at circumferentially spaced points in advance of the point of contact of said annular faces, and a driving connection between said elements and the drive shaft for imparting rotation to the latter upon wabbling of the wabbler elements and counterbalance means for each wabbler element.

17. In a motor, a drive shaft journaled for rotation, a pair of opposed wabbler elements mounted obliquely relative to the drive shaft and having frusto-conical annular faces constantly engaging at one point, means for progressively imparting thrusts at circumferentially spaced points in advance of the point of contact of said annular faces, and a driving connection between said elements and the drive shaft for imparting rotation to the latter upon wabbling of the wabbler elements and counterbalance means for each wabbler element including a weight and a hub by which the said weight is carried, said hub mounted for independent turning movement on and with respect to the drive shaft.

18. In a motor, a drive shaft journaled for rotation, a pair of opposed wabbler elements mounted obliquely relative to the drive shaft and having frusto-conical annular faces constantly engaging at one point, means for progressively imparting thrusts at circumferentially spaced points in advance of the point of contact of said annular faces, and a driving connection between said elements and the drive shaft for imparting rotation to the latter upon wabbling of the wabbler elements and counterbalance means for each wabbler element including a weight and a hub by which the said weight is carried, said hub mounted for independent turning movement on and with respect to the drive shaft and interengaging means on each wabbler element and each weight for rotating the weight in an opposite direction to the direction of rotation of the drive shaft.

19. In a motor, a drive shaft journaled for rotation, a pair of opposed wabbler elements mounted obliquely relative to the drive shaft and having frusto-conical annular faces constantly engaging at one point, means for progressively imparting thrusts at circumferentially spaced points in advance of the point of contact of said annular faces, and a driving connection between said elements and the drive shaft for imparting rotation to the latter upon wabbling of the wabbler elements and counterbalance means for each wabbler element including a weight and a hub by which the said weight is carried, said hub mounted for independent turning movement on and with respect to the drive shaft and interengaging means on each wabbler element and each weight for rotating the weight in an opposite direction to the direction of rotation of the drive shaft, said latter means comprising an eccentric ring carried by and disposed axially of the wabbler element.

WILLIAM C. DURYEA.